United States Patent [19]

Mold et al.

[11] 4,049,050

[45] Sept. 20, 1977

[54] RECUPERATOR STRUCTURES

[75] Inventors: Donald F. Mold; Ronald G. Rice, both of Toledo, Ohio

[73] Assignee: Owens-Illinois, Inc., Toledo, Ohio

[21] Appl. No.: 687,956

[22] Filed: May 19, 1976

Related U.S. Application Data

[62] Division of Ser. No. 554,791, March 3, 1975.

[51] Int. Cl.$^2$ .................. C03C 23/20; C03B 32/00; F28D 7/00; F28F 1/00
[52] U.S. Cl. .................................. 165/165; 65/4 A; 65/33
[58] Field of Search ............ 165/10, 165, 166; 65/4 R, 4 A, 4 B, 33

[56] References Cited

U.S. PATENT DOCUMENTS

| | | | |
|---|---|---|---|
| 907,736 | 12/1908 | Gobbe | 165/165 |
| 2,634,958 | 4/1953 | Simpellaar | 165/166 |
| 2,821,369 | 1/1958 | Hilliard | 165/165 |
| 2,879,050 | 3/1959 | Fulger | 165/165 |
| 2,887,304 | 5/1959 | Hilliard | 165/165 |
| 3,380,818 | 4/1968 | Smith | 65/33 |
| 3,380,838 | 4/1968 | Maimz | 65/33 X |
| 3,627,039 | 12/1971 | Tietenbacher | 165/166 |
| 3,679,384 | 7/1972 | Colson et al. | 65/4 B |
| 3,771,592 | 11/1973 | Sayers | 165/10 |
| 3,847,211 | 1/1969 | Fischel et al. | 165/166 |

Primary Examiner—Albert W. Davis, Jr.
Assistant Examiner—Ira S. Lazarus
Attorney, Agent, or Firm—J. R. Nelson

[57] ABSTRACT

The novel embodiments disclosed herein also illustrate a novel method for making a recuperator structure. A multiplicity of elongated tubes are formed of a glass that is thermally crystallizable to a low expansion glass-ceramic. In one embodiment, each of the tubes is sealed at each end and contains an expansible fluid medium. Each of the tubes has a portion intermediate the ends thereof which is substantially straight. Pluralities of the multiplicity of tubes are tightly packed into a first plurality of layers with the axes of the intermediate portions of the tubes in each layer essentially parallel to each other. The first plurality of layers are arranged with the straight intermediate tube portions thereof in a stacked array with respect to each other, and with the axes of the intermediate portions of the tubes in each layer essentially parallel to the axes of the corresponding intermediate tube portions in the other first plurality of layers. This enables the formation of a first series of parallel passageways when the sealed ends of the tubes in the first plurality of layers are opened to receive a first fluid. Each layer of the first plurality of layers of tubes is spaced from at least one of the adjacent first plurality layers in the array by interposing spacer means between the layers being spaced.

6 Claims, 15 Drawing Figures

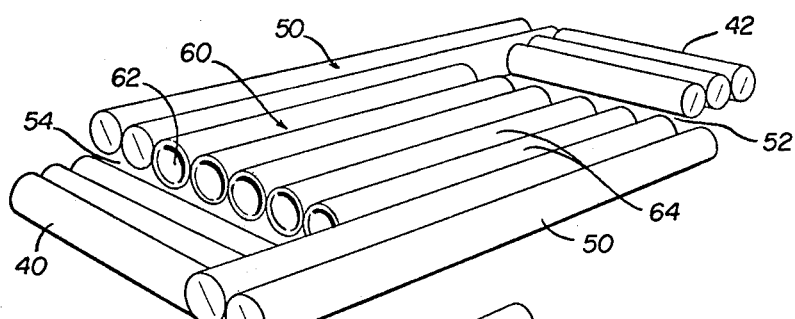
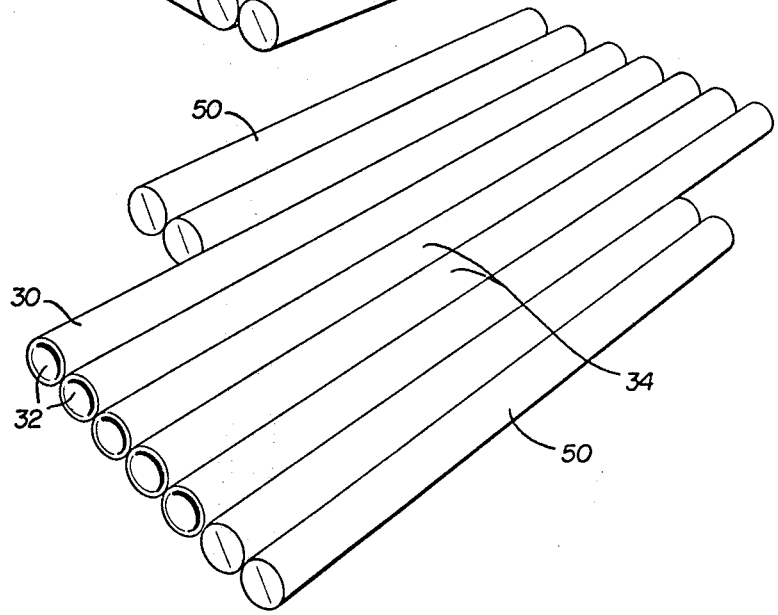
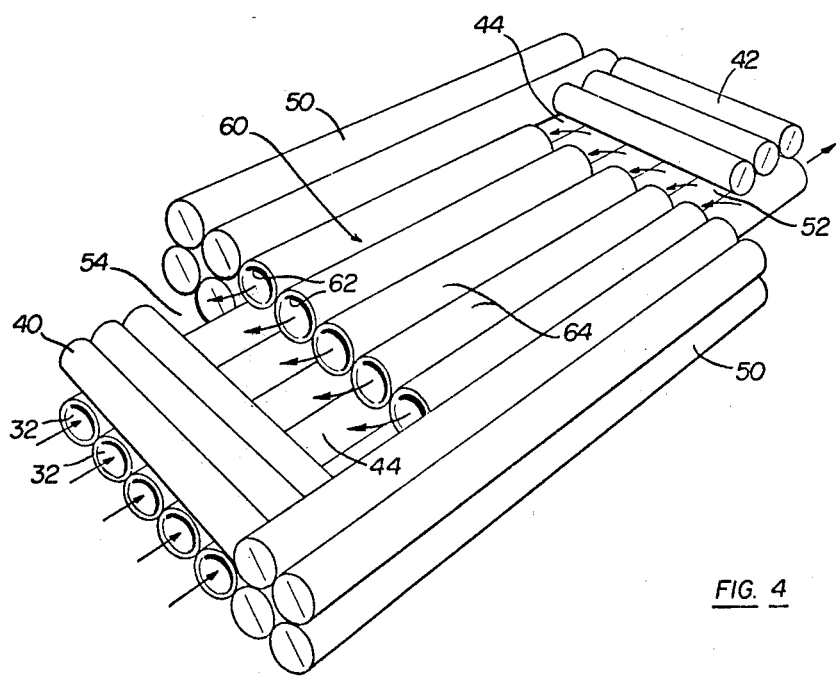

FIG. 5
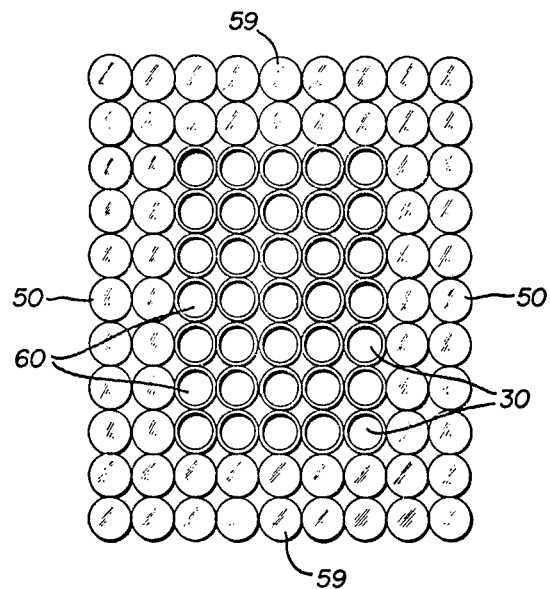
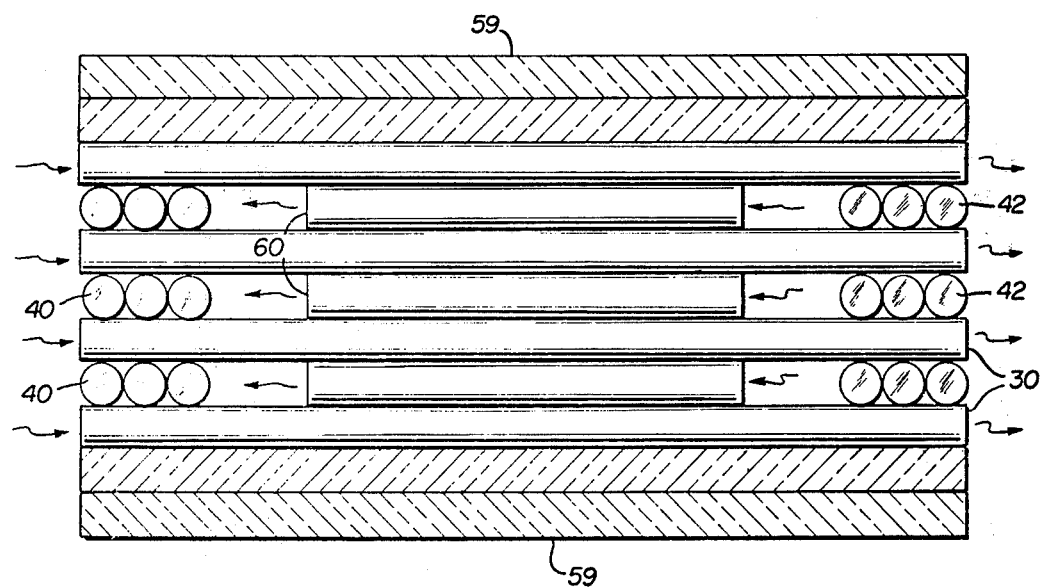
FIG. 6

RECUPERATOR STRUCTURES

This is a Division, of application Ser. No. 554,791 filed Mar. 3, 1975.

In some embodiments herein, a separated pair of spacer means extend transversely across the tubes of the first plurality layers being spaced and adjacent the intermediate tube portions of the first plurality layers to define a second series of passageways extending from first spacer means at one end of the intermediate tube portions to second spacer means at the other end of the intermediate tube portions to receive a second fluid. The separated spacer means may also function as a header connecting means for the first series of parallel passageways. The spacer means is also formed of glass that is thermally crystallizable to a low expansion glass-ceramic having a coefficient of lineal thermal expansion that is substantially the same as the elongated tubes of the first plurality of layers. Fluid flow directing means are longitudinally disposed along each of the second series passageways to confine the second fluid in and direct the flow of the second fluid through the second series passageways in a direction parallel to and in heat exchange relationship with the first series intermediate tube portions adjacent the second series passageways. The flow directing means for the second fluid may include a second plurality of layers of tubes, each tube in said second plurality of layers having an intermediate portion that is parallel to other second series and first series intermediate tube portions. The flow directing means is also formed of a glass that is thermally crystallizable to a low expansion glass-ceramic having a coefficient of lineal thermal expansion that is substantially the same as the elongated tubes. The outer surfaces of an assembly of elongated tubes, spacer means, and fluid flow directing means are constrained to restrict outward movement of those portions of the assembly. The constrained assembly is then subjected to a heat treatment which includes temperatures sufficient to soften the elongated tubes and thus to cause said fluid medium entrapped therein to expand and urge the tubes into contact with adjacent tubes, the spacer means and the flow directing means to fuse the assembly portions into an integral mass. The heat treatment further includes temperatures sufficient to effect crystallization of the tubes, the spacer means, and the fluid flow directing means into a low expansion glass-ceramic.

BACKGROUND OF THE INVENTION

This invention constitutes an improvement over the structure and method disclosed in the patent application of Y. K. Pei, Ser. No. 30,859, filed in the United States Patent Office on Apr. 22, 1970, which is since abandoned and filled in a continuation-in-part application Ser. No. 146,665 of May 25, 1971, since abandoned, from which a divisional application Ser. No. 250,550 of May 5, 1972, now U.S. Pat. No. 3,871,852, and a continuation application Ser. No. 650,995 of Jan. 21, 1976, respectively, were filled, and a further continuation-in-part application herewith, all of which are owned by and assigned to the assignee of the present invention.

In the above-referenced application of Pei, there is disclosed an assembly or matrix of integrally fused tubes useful as a compact regenerative heat exchanger, buoyancy material, sound absorption material, heat insulation material, and the like. The advantages of this type of structure and the requirements for each of the structures of this type, particularly a regenerator structure, are set forth fully in the Pei application and need not be repeated here.

In the above-referenced Pei application, the regenerator structure consists of a plurality of individual, axially parallel, open end glass-ceramic tubes which are thermally bonded to one another and integrated into an overall regenerator structure. Gas flow through the regenerator occurs through the individual tubes, one open end of each tube forming an inlet and the other open end of the tube forming the outlet. In a typical thermal regenerator installation one or both faces of the regenerator is contacted by a seal bar. The regenerator matrix is rotated relative to the seal bar which is urged against the regenerator end surface under an appreciable axial load. Because of matrix end face-seal bar contact under the sealing load, some abrasive wearing of the matrix end face will occur over an extended service period, particularly since the matrix end face is defined by the open ends of the individual tubes. Additionally, the strength of the matrix and its ability to withstand axially or radially applied loads in operation is dependent upon the degree of integral bonding between adjacent tubes. While such matrices made in accordance with the disclosure of the Pei application are capable of functioning satisfactorily as regenerators, and although improvements have been made in increasing the resistance of the matrix end faces to wear, it is desirable to avoid the seal bar wear problems and while maintaining a high level of heat exchange efficiency. Moreover, it is desirable to do away with mechanisms for moving or driving regenerators.

In the above-noted application of Pei, there is also disclosed a heat exchange module which is constructed by superimposing a plurality of layers of tubes, one layer above the other in successive parallel planes, with the tubes in each plane being essentially parallel to each other and transverse to the tubes in at least one of the adjacent layers. The matrix of tubes, each of the tubes having both ends sealed, is heated to soften, expand and fuse the tubes together into an integral module. The sealed ends are opened and a plurality of such modules may be assembled into a toroidally-shaped structure, each module being separated from an adjacent module by a wedge-shape member. In this latter module structure, the problem of seal bar wear has been removed, and there is a crossflow relationship between the two series of passages rather than first passing a hot gas through a tube and then moving the tube to enable passage of a cold gas therethrough to pick up the heat remaining therein from passage of the hot gas therethrough. Although there is no movement of the module in this latter structure, it is still desirable to improve the heat exchange efficiency over that obtained by a crossflow relationship, while retaining the advantages of an integral low expansion glass-ceramic structure of the type described, over the metal or ceramic heat exchange structures of the prior art.

A counterflow recuperator has one of the highest heat exchange efficiencies known to the prior art. However, parallel and counterflow recuperators in high temperature applications made of metals such as nickle alloy are expensive and difficult to shape and braze. Such metal recuperators often leak after repeated cycling. Recuperators have also been made of corrugated sheets of ceramic which are stacked to form a crossflow pattern and then sintered. However, it is difficult to make the joints of these prior art recuperators and failures of recuperators occur in these areas. Heat-resistant materials used in the prior art recuperator bodies are expensive and often fail in thermal fatigue, while sintered ceramic recuperators are sometimes undesirably porous.

Accordingly, it is an object of this invention to provide a recuperator structure having superior properties which utilizes a low expansion, nonporous heat exchange body such as made from glass-ceramic materials, and which does not have the deficiencies of previous regenerator and recuperator structures.

It is another object of this invention to provide an improved method for making a novel recuperator heat exchange assembly.

A still further object of this invention is to provide an improved apparatus, and a method for making such apparatus, for conducting fluids in heat exchange passageways which are substantially parallel to each other and which keep the fluid streams separated, thereby preventing crossflow between different fluid streams.

SUMMARY OF THE INVENTION

The above objects are illustrated in the several embodiments of this invention herein of recuperator heat-exchange assemblies. Each finished assembly includes a first plurality of stacked layers of tubes wherein each tube has open ends and a portion intermediate the open ends which is essentially parallel to the corresponding intermediate portions of the other tubes in the same first plurality layer and the corresponding intermediate tube portions in the other first plurality layers to form a first series of longitudinally extending parallel passageways for receiving a first fluid.

Header connecting and spacing means are provided for receiving the open tube ends of each first plurality and supporting the opposing open ends in each layer to maintain the intermediate tube portions of each first plurality layer in a spaced relationship with respect to the intermediate tube portions of the tubes in at least one of the adjacent stacked first plurality layers in the assembly to define a second series of passageways between first plurality layers of intermediate tube portions for receiving a second fluid. The header connecting means closes the spaces between and around the open end of the tubes in the first plurality layers to prevent crossflow between the first and second fluid streams.

Means are provided which extend longitudinally along each of the second passageways for confining the second fluid in and directing the flow of the second fluid through the second series of passageways in a direction parallel to and in heat-exchange relationship with the intermediate tube portions of the first plurality layers adjacent the second series passageways. The second fluid directing means has entry and exit port means formed therein for receiving and discharging the second fluid.

The stacked first plurality layers of tubes, the header connecting means, and the second fluid directing means are fused together to form an integral assembly, and are constructed of material having essentially zero porosity, consisting essentially of an inorganic crystalline oxide ceramic material, and, depending upon the temperature range in which the structure is to be used, desirably having an average coefficient of lineal thermal expansion of about $-18$ to $+50 \times 10^{-7}/°$ C over the range of $0° - 300°$ C. While the integral assembly described hereinbefore desirably has an average coefficient of lineal thermal expansion within the range set forth above, the coefficient of lineal thermal expansion is advantageously about $-12$ to $+12 \times 10^{-7}/°$ C over the range $0° - 300°$ C, and preferably has an average coefficient of lineal thermal expansion of about $-5$ to $+5 \times 10^{-7}/°$ C over the range of $0° - 300°$ C. As noted above, the temperature ranges in which the structure is to be used will determine the desired range of lineal thermal expansion. However, it should also be noted that the structures herein are very useful in obtaining heat exchanges between corrosive fluids, and in this instance the lineal thermal expansion characteristics may not be as important.

In one embodiment disclosed herein the second fluid confining and directing means includes a second series of layers of tubes. Each tube in each of the second series layers has open ends in the finished assembly and a portion intermediate the open ends which is essentially parallel to corresponding intermediate portions of the other tubes in the same layer and to corresponding intermediate tube portions in the other second series layers. The intermediate tube portions of the second series layers are also essentially parallel to the intermediate tube portions of the first-mentioned plurality of stacked layers of tubes. The intermediate tube portions of each of the second series layers are disposed adjacent to and in heat-exchange relationship with the intermediate tube portions of at least one of the first-mentioned plurality of layers. In embodiments shown herein, the tubes of each second series layer terminate short of the header connecting means so that the open ends thereof may receive and discharge the second fluid from and to the pair of spaces defined between the ends of the tubes of each second series layer and the header connecting means. Means may be provided for blocking one side of each pair of spaces defined between the open ends of a second series tube layer and the header connecting means so that the second fluid may be directed into the other side of one of each pair of the defined spaces and discharged from the other side of the other of each pair of defined spaces.

In another embodiment disclosed herein the second fluid confining and directing means includes a second series of layers of tubes with the tube ends of each second series layer terminated along lines extending obliquely with respect to the longitudinally extending parallel passageways. A third series of tubes, having one set of open ends which mate with the open tube ends of each second series layer along the oblique lines defined thereby, are provided and extend transversely to each second series passageway to direct the second fluid into and receive the second fluid from the tubes of each second series layer.

In other embodiments disclosed herein the second fluid confining and directing means includes means extending longitudinally along each side of the second passageways for confining the second fluid in the second series passageways. The side confining means terminate short of the header connecting means to define entry and exit port means for the second fluid. The side confining means for one side of each second series passageway may extend from a header connecting means for a first end of the stacked layers of tubes and terminate short of a header connecting means for a second end of the stacked layers of tubes to define one of the entry and exit port means for the second fluid. The side confining means for the other side of each second series passageway may extend from a header connecting means for the second end of the stacked layers of tubes and terminate short of the header connecting means for the first ends of the stacked layers of tubes to define the other of the entry and exit port means.

The just described embodiment may further include flow directing wall means extending along each second series passageway between the stacked first series layers. The flow directing wall means are essentially parallel to the intermediate tube portions and spaced inwardly in the second series passageway from the side confining means to guide the second fluid through each second series passageway in paths which are essentially parallel to the intermediate tube portions of the first series layers to enable a more efficient heat exchange between the first and second fluids.

The flow directing wall means may include a plurality of walls for each second series passageway, and may also include the side confining means for each second series passageway. The length of each flow directing wall in each second series passageway and the angle of the interior wall of the header connecting means with respect to the intermediate tube portions of the stacked layers of tubes may be selected so that the ends of each flow directing wall are located with respect to the interior wall of the header connecting means and the port means to enable a division of a second fluid stream entering the second series passageway into a plurality of smaller streams having similar volumes and flow rates. This division reduces turbulence and enhances the heat exchange between the first and second fluids.

The header connecting means may include a plurality of tightly packed individually axially elongated elements arranged with their axes parallel to each other and with their axes transverse to the tubes of the stacked layers of tubes, a group of such elements being disposed adjacent each end of each layer of tubes. Sealant means may be interposed between the adjacent elongated elements and between each group of elements adjacent the first series tube layers to join these elements and the tube layers into an integral mass thereby preventing crossflow between the first and second fluid streams.

The sealant means may be a ceramic cement, a foamable ceramic cement, or a sintered frit. Each group of the elongated elements advantageously includes at least one axially elongated tube having relatively thin walls and sealed ends, each such tube having been expanded by heat treatment to compress the sealant material and to urge the elements together to insure closing the interstices between header elements and the tubes in adjacent first series layers.

The second fluid confining and directing means may include a plurality of layers of tightly packed individually axially elongated elements arranged with their axes parallel to each other and also parallel to the intermediate tube portions of the stacked first series layers of tubes, a group of such layers of elements being disposed adjacent each side of the stacked first series layers of tubes and the second series passageways formed therebetween to direct the flow of the second fluid through the second passageways in a direction parallel to the intermediate tube portions of the stacked first series layers of tubes. Sealant means may be interposed between adjacent elongated elements in a layer, between adjacent layers of said elongated elements, and between the elongated elements and the stacked first series layers of tubes and the header connecting means, thereby joining the elongated elements as an integral part of the assembly and preventing crossflow between the first and second fluid streams. Again, the sealant means may be a ceramic cement, a foamable ceramic cement, a sintered frit, or other suitable sealants.

Each layer of the elements advantageously includes at least one axially elongated tube having relatively thin walls and sealed ends, each such tube having been expanded by heat treatment to compress the sealant in the interstices and to urge the elements together to insure closing the interstices between the elongated elements in a layer, between adjacent layers of the elongated elements, and between adjacent first series layers of stacked tubes. If second series layers of tubes are used, this also urges the tubes in those layers closer together to aid in fusion.

Other objects, features and advantages will become apparent from the following description taken in conjunction with the accompanying drawings, in which:

FIG. 2 is a view in a perspective of one of the layers of tubes and rods in the assembly illustrated in FIG. 1;

FIG. 3 is a view in perspective of another of the layers of tubes and rods utilized in the assembly illustrated in FIG. 1;

FIG. 4 is a view in perspective of the layers of FIGS. 2 and 3 combined to illustrate the operation of the assembly shown in FIG. 1;

FIG. 5 is a cross-sectional view of the assembly illustrated in FIG. 1, the section being taken transverse to the axes of the tubes and rods of the assembly of FIG. 1;

FIG. 6 is a cross-sectional view of the assembly illustrated in FIG. 1, the section being taken longitudinally along the axes of the tubes and rods and through the center in the axial direction of the assembly shown in FIG. 1;

DESCRIPTION OF THE PREFERRED EMBODIMENTS

Figure 1:
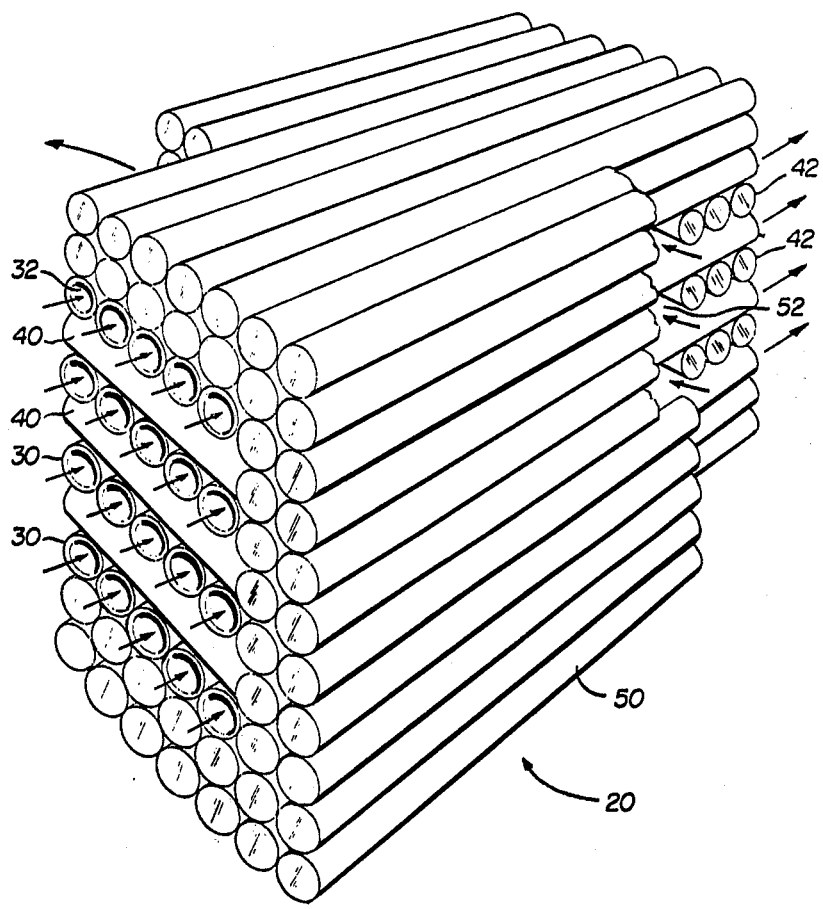
FIG. 1 is a perspective view of an embodiment of a recuperator structure assembly illustrating the teachings of this invention.

Referring to FIGS. 1 through 6 there is illustrated a recuperator heat-exchange assembly 20 which embodies the teachings of this invention. The assembly 20 comprises a first plurality of stacked layers of tubes 30, each tube having open ends 32 and a portion 34 (best seen in FIG. 3) intermediate the open ends which is essentially parallel to the corresponding intermediate portions 34 of the other tubes in the same layer 30 and to corresponding intermediate tube portions 34 in the other layers 30 to form a first series of longitudinally extending parallel passageways for receiving a first fluid.

As best seen in FIGS. 2, 4 and 6 header connecting means 40 and 42 are provided for receiving the open tube ends 32 of each layer 30 and supporting the opposing open ends and tubes in each layer 30 to maintain the intermediate tube portions 34 of each layer 30 in a spaced relationship with respect to the intermediate tube portions 34 of the tubes in at least one of the adjacent stacked layers 30 in the assembly 20 to define a second series of passageways 44 between layers 30 of intermediate tube portion 34 for receiving a second fluid (best seen in FIG. 4). Although not shown in FIGS. 1 through 6 for purposes of clarity, it will be described hereinafter how the header connecting means closes the spaces between and around the open ends 32 of the tubes in the layers 30 to prevent crossflow between the first and second fluid streams. A sealant means 48 as illustrated in FIG. 12 may be utilized for such purpose.

A second fluid confining and directing means generally indicated at 50 is provided, extending longitudinally along each of the second passageways 44 for confining the second fluid in and directing the flow of the second fluid through the second series of passageways 44 in a direction parallel to and in heat-exchange relationship with the intermediate tube portions 34 adjacent the second series passageways 44. The second fluid direction means 50 has entry port means 52 and exit port means 54 (best seen in FIG. 4).

The header connecting means 40, 42 each comprises a plurality of tightly packed individually axially elongated elements 46 arranged with their axes parallel to each other and, in this embodiment as best seen in FIGS. 2, 4 and 6, with their axes transverse to the ends of the tubes of the stacked layers 30, a group of such elements 46 being disposed adjacent each end of each layer 30 of tubes. Although not shown in the drawings it should be recognized that the header connecting means may be constructed from layers of shorter tubes or rods arranged with their axes parallel to the tubes 30, with each such layer extending transversely across the layers 30.

Figure 12:
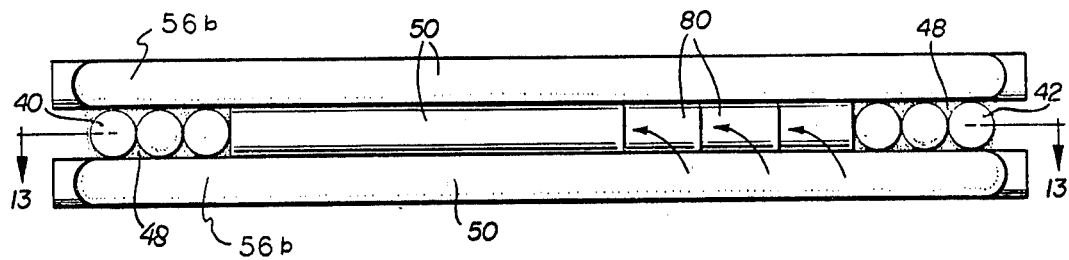
FIG. 12 is a side view of a portion of an assembly of a fourth embodiment of the teachings of this invention.

As noted at 48 in FIG. 12 a sealant means may be interposed between adjacent elements 46 and between each group of elements and adjacent tube layers 30 joining the elements and the tube layers into an integral mass and preventing crossflow between the first and second fluid streams. Each group of elements 46 advantageously includes at least one axially elongated tube, such as illustrated at 46a in FIG. 13 having relatively thin walls and sealed ends. Each such tube will be expanded by a heat treatment to be described hereinafter to compress the sealant material 48 and to urge elements 46 together to insure closing the interstices between the header elements 46 and the tubes in adjacent layers 30.

The second fluid confining and directing means 50 as illustrated in FIGS. 1 through 6 includes a plurality of layers of tightly packed individually axially elongated elements 56 arranged with their axes parallel to each other and also parallel to the intermediate tube portions 34 of the stacked layers 30 of tubes. A group of such layers of elements 56 are disposed adjacent each side of the stacked layers of tubes 30 and each side of the second series passageways 44 formed therebetween to direct the flow of the second fluid through the second passageways 44 in a direction parallel to the intermediate tube portions of the stacked layers of tubes 30.

Figure 13:
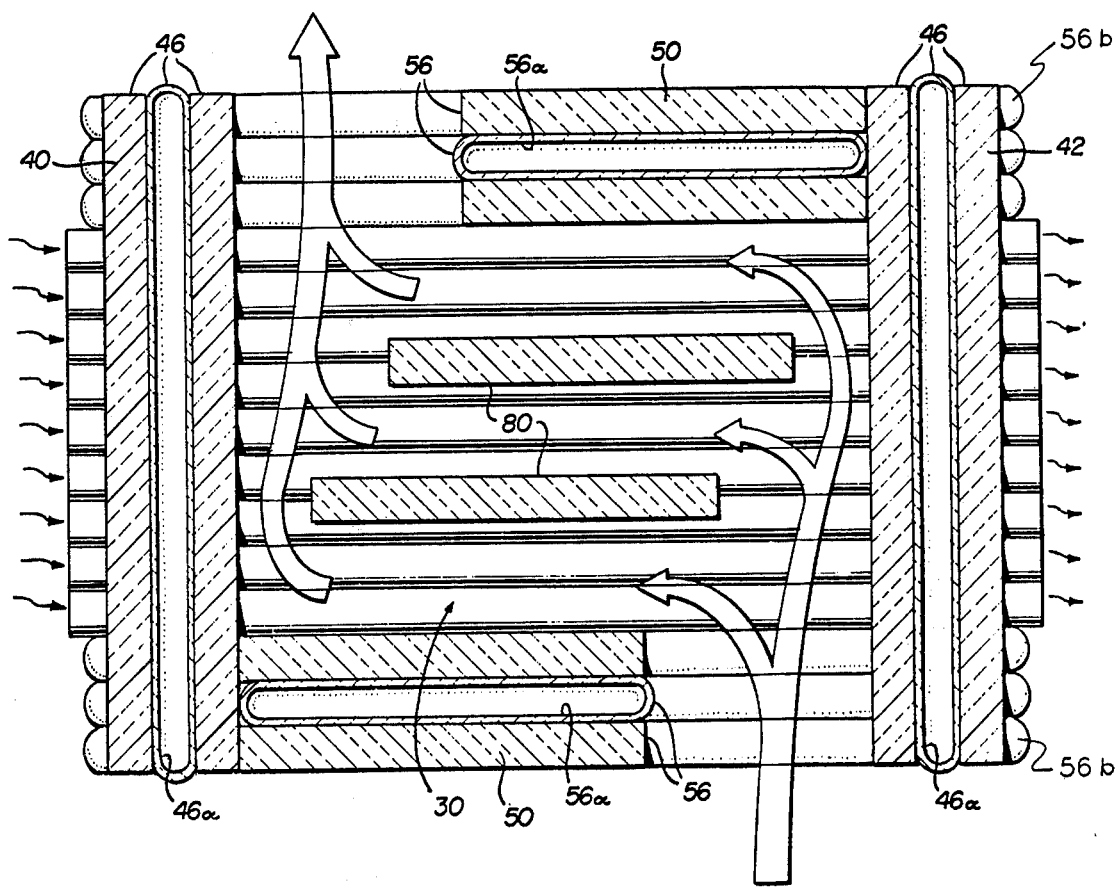
FIG. 13 is a cross-sectional view taken along lines 13—13 of the assembly portion illustrated in FIG. 12.
Figure 14:
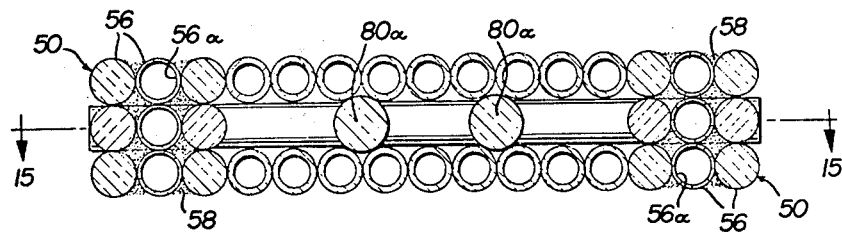
FIG. 14 is a cross-sectional view of a portion of an assembly of a fifth embodiment of the teachings of this invention taken transversely to the axes of the tubes and rods.

A sealant means such as illustrated at 58 in FIG. 14 is advantageously interposed between the adjacent elongated element 56 in each layer, between adjacent layers of the elongated elements 56, and between the elongated elements 56 and the stacked layers 30 of tubes and the header connecting means 40, 42, thereby joining the elongated elements as an integral part of the assembly and preventing crossflow between the first and second fluid streams. In addition, at least one axially elongated, thin-walled tube such as shown at 56a in FIGS. 13 and 14, may be included in each layer of elements 56. Such a sealed end tube with an expansible fluid medium therein will bloat during heat treatment to urge elements 56 together and toward adjacent layers (and/or layers 60) to compress sealant material and aid in fusion of elements 56 and layers 30 (and/or layers 60) into an integral mass.

As best seen in FIGS. 2, 4 and 6 the second fluid confining and directing means may also include a second series of layers of tubes 60. Each tube in each of the second series layers 60 has open ends 62 and a portion 64 intermediate the open ends 62 which is essentially parallel to corresponding intermediate portions 64 of the other tubes in the same payer and the corresponding intermediate tube portions 64 in the other second series layers 60. The intermediate tube portions 64 of the second series layers 60 are also essentially parallel to the intermediate tube portions 34 of the first-mentioned plurality of stacked layers 30. The intermediate tube portions 64 of each of the second series layers 60 are disposed adjacent to and in heat-exchange relationship with the intermediate tube portions 34 of at least one of the first-mentioned plurality of layers 30.

As illustrated in the embodiments shown in FIGS. 1 through 11, the tubes of each second series layer 60 terminate short of the header connecting means 40, 42 so that the open ends 62 thereof may receive and discharge the second fluid from and to the pair of spaces defined between the ends of the tubes of each second series layer 60 and the header connecting means 40, 42.

As illustrated in FIGS. 1 through 9 and 11 the elements 56 of the second fluid confining and directing means 50 extend so that one side of each pair of spaces, defined between the open ends 62 of a second series tube layer 60 and the header connecting means 40 or 42, are blocked so that the second fluid may be directed into the other side of one of each pair of the defined spaces and discharged from the other side of the other of each pair of defined spaces through the entry and exit ports 52, 54 as best seen in FIG. 2.

Figure 10:
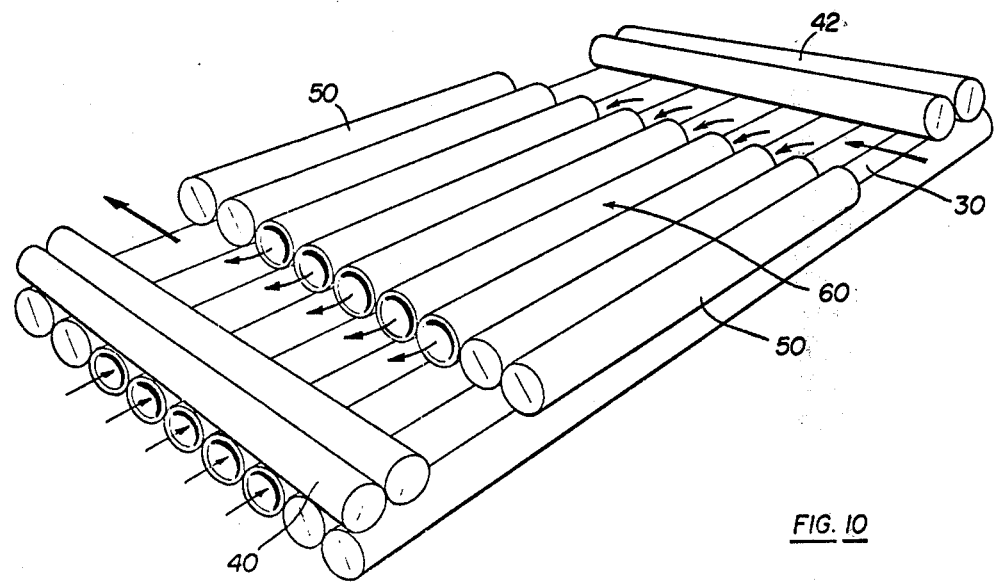
FIG. 10 is a view in perspective of two layers of a second embodiment of a heat exchange recuperator assembly.

In the embodiment illustrated in FIG. 10, such blocking means for the spaces between the header connecting means 40, 42 and the open ends 62 of the layers 60 are not provided. The embodiment in FIG. 10 is illustrated in the event that the user wishes to provide selective blocking means or flow directing valve means to selectively obtain parallel flow or counterflow heat exchange action through the intermediate tube portions 64 of the layers 60. Such selective blocking means would be incorporated in the header apparatus which connects the second fluid stream for flow into and for receiving flow from the assembly 20.

Figure 11:
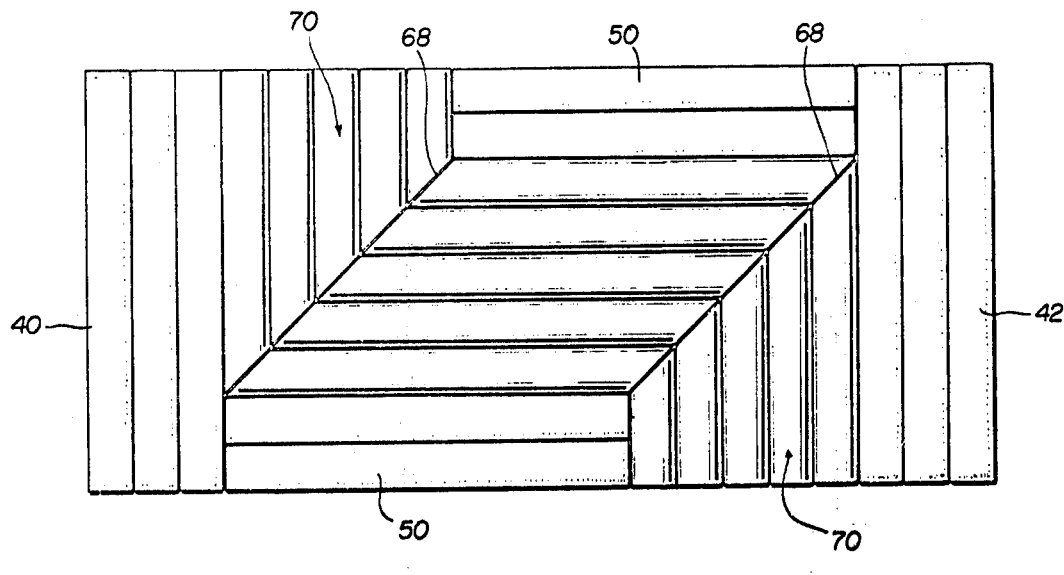
FIG. 11 is a plan view of a third embodiment of a tube layer that may be utilized in constructing an assembly similar to that shown in FIG. 1.

Referring now to FIG. 11, it may be seen that the tube ends of each second series layer 60 terminate along lines extending obliquely with respect to the longitudinally extending passageways 44 formed by the tube layers 30.

In this instance a third series of tubes 70 are provided which have open ends which mate with the open tube ends of each second series layer 60 along the obliquely extending lines defined thereby. The third series of tubes 70 then extend transversely to each second series layer 60 to direct the second fluid into and receive second fluid from the tubes of each second series layer 60.

Referring now to FIG. 5, it may be seen that in addition to the header connecting means 40, 42 at the ends and the second fluid confining and directing means 50 along the sides of the assembly 20, tightly packed elongated elements 59 may be provided at the top and the bottom of the assembly 20 to provide protective, insulating or flow sealing top and bottom skins for the assembly 20. As discussed hereinbefore with respect to the header connecting means 40, 42 and with respect to the second fluid confining and directing means 50, a sealant means such as that illustrated at 48, 58 in FIGS. 12 and 14 may be interposed between the interstices of the elongated elements 59 to complete the sealing of the top and bottom skins formed thereby. Although the elongated elements 59 are shown and illustrated in FIG. 5 as solid glass rods, hollow sealed tubes such as those illustrated at 46a and 56a in FIGS. 13 and 14 may be provided to again urge the elements 59 together and to compress any sealant material in the interstices therebetween.

Although the assembly 20 illustrated in FIGS. 1 through 6 shows the tubes as round, the interface between parallel layers of sealed end tubes in which all sealed end tubes are parallel to each other will tend to assume a semi-hexagonal configuration, while the interface with the sealed end tubes that are transverse to each other will tend to assume a substantially square configuration, both in response to expansion or bloating during heat treatment. The sealed end tubes adjacent to rods and to open end tubes will assume the configuration available to them dependent upon the heat treatment, expansion of the sealed end tubes, and the amount and type of sealant material between the sealed end tubes and the rods or open end tubes.

Thus, when the sealed end tubes in the layers 30 are expanded in the manner to be described hereinafter, each tube wall of a tube in the layer 30 will advantageously fuse with and have a common wall with each other and with the tubes in the layers 60, rather than point or line contact as shown.

To facilitate the assembling of the tubes and individually axially elongated elements in layers as shown in FIGS. 2 and 3, so that the layers may be superimposed one upon another, the tubes and elements may be placed side by side as shown in FIGS. 2 and 3 in the contacting relationship illustrated, and the upper surface of each layer may be spray coated with an air-setting bonding composition so that the layer becomes rigid enough to handle like a thin sheet of plastic material. The layers may then be arranged, along with similarly assembled layers of protective skins composed of the elongated elements 59, to form the assembly 20 illustrated in FIG. 1 for heat treatment.

Figure 7:
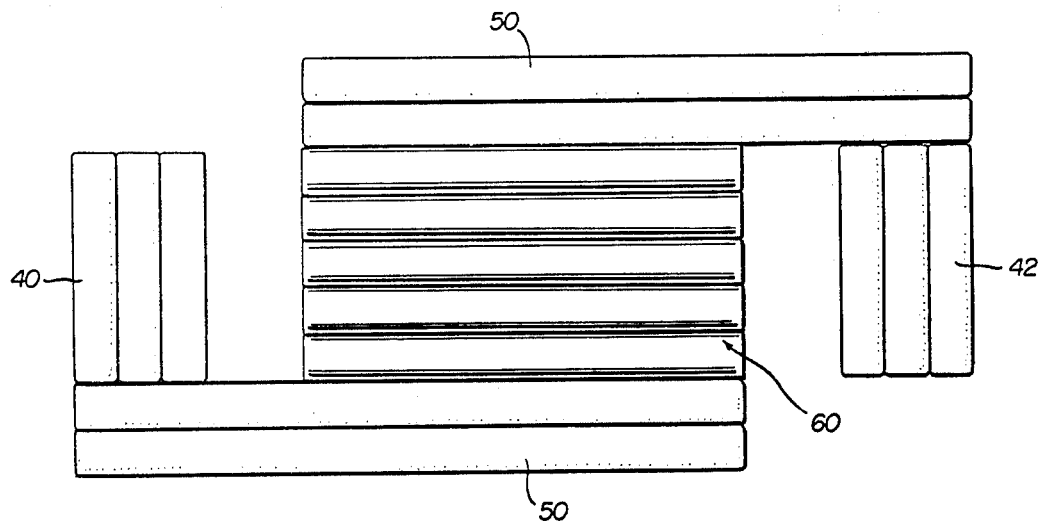
FIGS. 7 and 8 are plan views of layers of utilizing tubes and no rods which may be utilized in manufacturing an assembly similar to that illustrated in FIG. 1.
Figure 8:
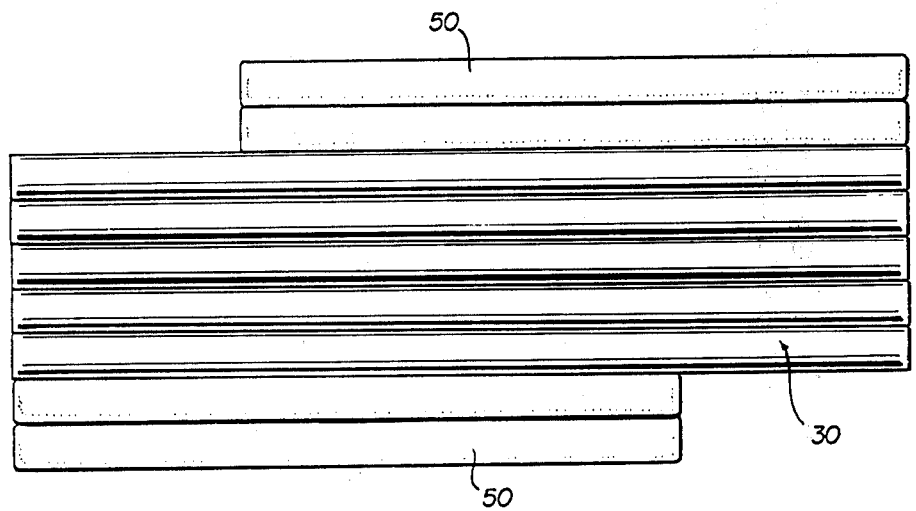
Figure 9:
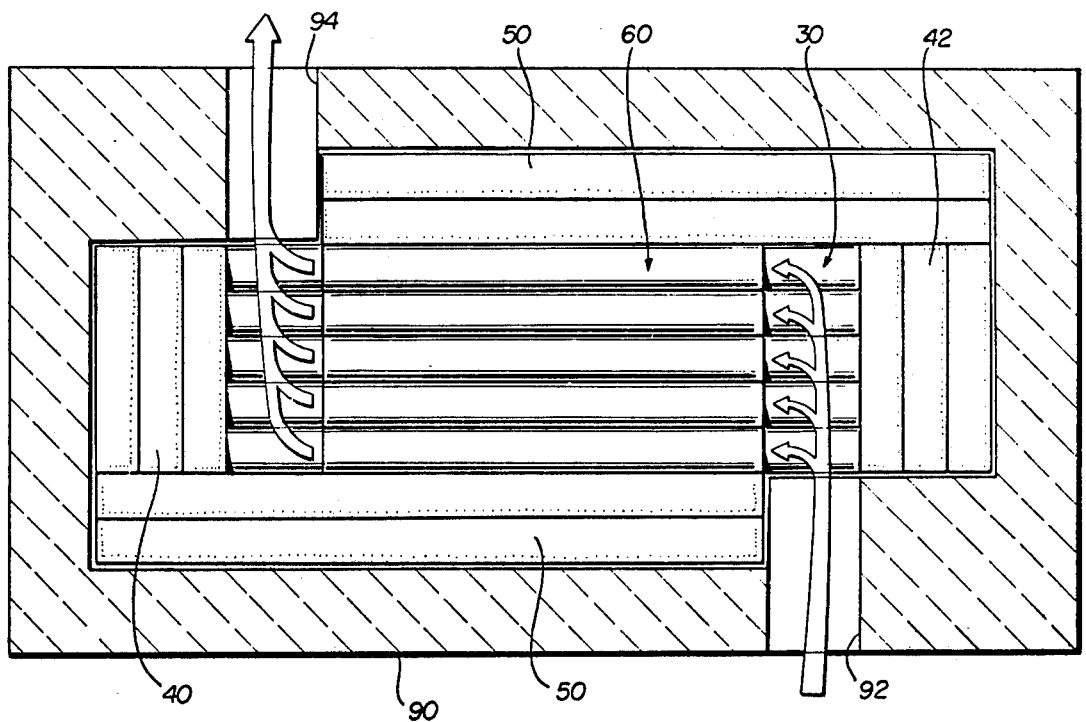
FIG. 9 is a plan view of a mold portion which may be utilized to heat treat an assembly similar to that illustrated in FIG. 1.

Referring to FIGS. 7, 8 and 9 there are shown embodiments of tube layers for this invention, and a method will be described for heat treating same, which will enable those skilled in the art to practice an embodiment of the method of this invention. In FIG. 7 there is provided a second series layers 60 of open ended tubes. The open ended tubes 60 advantageously generally have thicker walls than the sealed end tubes to be described in the other portion of FIGS. 7 and 8 since they are not to be expanded and must be sufficiently thick to prevent collapse or sagging during heat treatment of the assembly 20. The side confining means 50 in this instance includes individually axially elongated elements 56 which are relatively thin walled tubes which are sealed at each end and contain an expansible fluid medium. Similarly, the elements 46 in the header connecting means 40, 42 are also tubes which are sealed at each end and contain an expansible fluid medium.

Referring to FIG. 8 the elements 56 of the second fluid confining means 50 and the tubes of the layer 30 are both comprised of tubes that have relatively thin walls, are sealed at each end and contain an expansible fluid medium.

The tubes in the layers illustrated in FIGS. 7 and 8 may be tightly packed in each layer and arranged in a plurality of layers superimposed one upon the top of each other to form an assembly 20 similar to that illustrated in FIG. 1.

After the tubes are arranged in layers as illustrated in FIGS. 7 and 8 the upper surface of the layers may be spray coated with an air-setting bonding composition so those layers become rigid enough to handle like thin sheets of plastic material. The air-setting bonding composition which can be used may be a polyurethane, although other compositions will be readily understood by the art as accomplishing the same purpose. For instance, a 2.5 to 3 weight percent solution of nitrocellulose and amyl acetate can also be used. The composition used should have the property of setting quickly so as to adhere the tubes to each other and yet volatize rapidly when exposed to the heat necessary to soften the tube walls and diffuse the contacting wall surfaces together to form a monolithic structure. Preferably, the bonding composition should leave no residue.

The method and means by which end-sealed tubes are initially formed and sealed is shown and described in the patent application Ser. No. 132,720, filed Apr. 9, 1971, now U.S. Pat. No. 3,734,705, and commonly owned by the assignee of this application.

Usually, round thermally crystallizable tubing is used in forming the structure of the invention. As described in the above-referenced application Ser. No. 132,720, the drawing of round glass tubing to controlled dimensions is now an established art in the industry.

The sealed end tubing used in practicing one preferred embodiment of the methods of this invention has a maximum inner diameter of up to about 0.1 inch, a wall thickness of 0.001 to 0.003 inch and an inside wall diameter to wall thickness ratio of at least 6. Substantially lower inside diameter to wall thickness ratios may result in a relative ineffectiveness of the process to urge the sealed end tubes into a good fusion bond when using a temperature schedule which is also effective to properly nucleate and crystallize the glass tubes to a glass-ceramic during the expanding and fusion heating cycle. In a now preferred embodiment of the invention the ratio of the inner diameter of the wall thickness of the thermally crystallizable glass tubes is at least 7.2.

An assembly 20 including upper and lower skins formed of elongated elements 59, which may also be tubes having sealed ends and a thermally expansible fluid medium therein, and the alternate layers of closely packed tubes illustrated in FIGS. 7 and 8 may be placed in a suitable mold 90 as illustrated in FIG. 9. Heavy cover members may be placed on the bottom of and the top of the mold 90 to retain the layers of tubes in a tightly packed condition and to constrain the assembly of tubes in their tightly configuration.

The mold 90 with the assembly 20 therein is then placed in a furnace and subjected to a heat sufficient to soften the glass walls of the sealed end tubes to cause the walls of the sealed end tubes to bloat or expand in response to the heating of the expansible fluid medium in each tube so that adjoining, contacting wall surfaces within the layers and between the layers are fused together to form a unitary maxtrix. As the individual tubes expand, the air or other gases in the interstices may exit through perforations which may be formed in the restraining top and bottom cover members on the mold 90.

Because of the particular nature of the assembly 20, parts 92 and 94 may be formed in mold 90 so that gas flow through the tube layers 60 may be used during heat treatment of the assembly 20 to achieve a relatively even temperature gradient across the assembly 20.

The heating of the thin-walled sealed end tubes expands them into close contact with each other, and into the interstices between the tubes and between the layers of sealed end and open end tubes to a greater or lesser extent, ideally to an extent to substantially fill the interstices. If the sealed end tubes are transverse to each other in adjacent layers, the resulting bloated tubes becomes essentially square or rectangular in cross section. The glass tubes, and rods if used, are fusing together and are also undergoing nucleation during the heat treatment, and heating of the assembly is continued for a time sufficient to in situ crystallize the glass to an at least partially crystalline material, commonly referred to as a glass-ceramic.

After the assembly has been crystallized, and usually after cooling to room temperature, the assembly 20 may be removed from the mold 90 and the tube ends 30 maybe removed by grinding or other suitable methods to obtain the opened ends 32 as illustrated in FIGS. 1 through 6.

Well suited for use in the methods of this invention are thermally crystallizable glasses that are convertible by heating to glass-ceramic bodies. As used herein, a glass-ceramic is an inorganic, essentially crystalline oxide ceramic material derived from an amorphous inorganic glass by in situ bulk thermal crystallization.

Prior to thermal in situ bulk crystallization, the thermally crystallizable glasses can be drawn into tubing using conventional glass-forming techniques and equipment. After being assembled in the manner shown in FIGS. 7, 8 and 9, the thermally crystallizable glass tubes are subjected to the controlled heat treatment until the tubes that are sealed have been expanded and fusion sealed to each other and crystallization of the entire structure is effected.

Thermally crystallizable glass compositions and the glass-ceramics resulting from thermal in situ crystallization thereof which are useful in the method and product of this invention are those which have, in the crystallized state, a coefficient of thermal expansion in the range of from $-18$ to $+50 \times 10^{-7}/°$ C over the range $0° - 300°$ C and preferably as low as $-12$ to $+12$, or $-5$ to $+5$, $\times 10^{-7}/°$ C over the range $0° - 300°$ C. The compositions usually used are those containing lithia, alumina, and silica, together with one or more nucleating agents including $TiO_2$, $ZrO_2$, $SnO_2$ or other known nucleating agents. In general, such compositions containing in weight percent about 55 to 75 $SiO_2$, about 15 to 25 $Al_2O_3$ and about 2 to 6 $Li_2O$, together with about 1.5 to 4 weight percent of nucleating agents selected from one or more of $TiO_2$, $ZrO_2$ and $SnO_2$, can be employed. Preferably, not more than about 2.5 weight percent $TiO_2$ is usually used or the crystallization is undesirably rapid to be compatible with the fullest expansion of the tubes in the bloating process.

Other ingredients can be present in small amounts, as is understood in the art, such as even as much as four or five weight percent ZnO, up to as much as three or four weight percent CaO, up to as much as eight percent MgO, and up to as much as five percent BaO, as long as the silica plus alumina plus lithia and the nucleating agent(s) are at least about 85, usually 90, weight percent of the total glass and the glass composition will thermally crystallize to a glass ceramic having the desired low expansion coefficient set forth hereinbefore. Exemplary compositions which can be used in the process of the invention include those compositions disclosed in U.S. Pat. No. 3,380,818, those compositions disclosed in U.S. Ser. No. 464,147 filed June 15, 1965, (now abandoned), and corresponding British Pat. Nos. 1,124,001 and 1,124,002 dated Dec. 9, 1968, and also those compositions disclosed in U.S. application Ser. No. 866,168 filed Oct. 13, 1969, now U.S. Pat. No. 3,625,718 and corresponding Netherlands Printed Patent Application No. 6805259, and also those compositions set forth in U.S. application Ser. No. 146,664, filed May 25, 1971 (now abandoned).

In any event, the thermally crystallizable glass tubings, whether end sealed or with open ends as in the layers 60, and glass rods if used, in the lithia-alumina-silica field containing nucleating agents as before described, are assembled as previously set forth and the constrained assembly of sealed tubing (containing the heat-expansible fluid) and the open ended tubing of the layers 60 are heated at any suitable rate that will not thermally shock the tubing up to a temperature range in the maximum nucleating range of the glass. The maximum nucleation range can be determined for all such glasses by the general method outlined in the above-referenced U.S. Pat. No. 3,380,818, beginning at Column 9, line 54.

For the process of the present invention, where sealing is to be effected or initiated while nucleation is occurring, it is preferred that the assembled tubes be heated in the range of 50° F to 250° F above the annealing point for a period of one hour or more. This time can be extended to 10 or 20 hours, and even longer times are not harmful. During this time of heating in such temperature range, nucleation is effected as well as fusion aided by pressure exerted by expansion of the trapped fluid in the sealed end tubes. Thereafter, the temperature is raised to a higher temperature than the first heating range, which higher temperature is at least 200° F above the annealing point temperature or may be as high as the final crystallization temperature (usually 1800° to 2300° F). The final crystallization can be effected at any such temperature range higher than the nucleation-expansion-fusion temperature (50° to 250° F above the annealing point temperature) and can be as low as 200° F above the annealing point or as high as 2300° F or as high as the upper liquidus temperature.

In this second stage of heating further expansion and the beginning of crystallization is effected, followed by the completion of crystallization on continued heating to a degree such that the assembly has an average coefficient of expansion in the range set forth hereinbefore.

While the temperature may be raised directly to the final crystallization temperature range at a suitable furnace heating rate, usually in the range of 10° to 300° F per hour, it is usually preferred to allow crystallization to be effected slowly while further expansion of the sealed end tubes and the fusion of sealed end tubes and open ended tubes (and rods, if used) is being effected by having an intermediate step between the first nucleation-and-fusion temperature range and the final crystallization temperature, which range is usually about 200° F to about 700° F usually from 200° to 500° F, above the annealing point of the original glass. Exemplary holding times in this intermediate range are from 1 to 8 hours, after which the assembly is heated up to the final crystallization temperature, usually in the range from about 1800° to 2300° F.

Obviously, no specific heat treatment instructions can be given suitable for all thermally crystallizable glass compositions. As is well-known, glass-ceramics do not have adequate strength if they are not sufficiently nucleated before crystals are allowed to grow appreciably in size, so that routine experiments known to those skilled in the art are used to determine what length of time is best to obtain an adequate number of crystallization centers or nuclei in the glass in the nucleation temperature range of 50° to 250° F above the annealing point.

Another point that must be kept in mind is that, if it is an object to obtain appreciable expansion beyond that necessary to get good fusion between the tubes, in other words to get appreciable reshaping of the sealed end tubes to fill the interstices between tubing, one should not raise the temperature too slowly when going from a nucleation temperature range to the intermediate range, since a rigid crystalline network may begin to set in and to prevent further expansion. It is found that some compositions can be heated at a rate as low as 10° to 50° F per hour to this intermediate temperature range and still get sufficient expansion of the tubing. On the other hand, some compositions have been found not to fully expand unless the heating rate from the initial nucleation-fusion temperature range to the intermediate temperature range is used, sometimes on the order of at least 200° F to 300° F per hour or higher.

The length of time of heating in the final crystallization temperature range of 1800° F to about 2300° F is from one-half hour to five or six hours, although longer times are no way deleterious. After the crystallization has been completed, the structure can be cooled at furnace rate or in air, depending upon the expansion characteristics, because the structure is of such low expansion that thermal shock will not harm it.

After the heat treatment just described, the product can now be cooled and the sealed ends of the tubes in the layers 30 cut or ground away to open each tube to atmospheric pressure. Alternatively, if the intermediate step of crystallization heat treating at a temperature range of 200° to 700° F above the annealing point temperature is used, the heat treatment can be interrupted after this intermediate step and cooled somewhat or even cooled to room temperature, and the ends of the tubes in the layers 30 cut or ground away and opened to atmospheric pressure. Then the assembly 20 can be heated up again into the final crystallization heat treatment range, where further and final crystallization is effected.

The assembly is then in a finished form similar to that illustrated in FIG. 1 and is ready for use with a first fluid such as hot exhaust gases passing into and out of the tubes in layers 30 through the opposing open ends 32 thereof. Cool air, such as from a compressor which will be later mixed with fuel for use in a turbine or for other applications, may be forced into the entry ports 52, through the open ends 62 of the tube layers 60, out the other opposing open ends 62 of the tube layers 60 and out the exit ports 54 of the assembly 20. A heat exchange may thus be effected between the hot gases passing through the tube layers 32 and the cool gases passing through the tube layers 60.

Although the example of manufacturing of an assembly 20 was described with reference to FIGS. 7, 8 and 9, in which the header connecting means 40, 42 and the side confining means 50 are of sealed end, thin-walled tubing, it should be noted that an effective assembly 20 may be manufactured using rods as illustrated in FIGS. 1 through 6 for the elements in the header connecting means 40, 42, the upper and lower skins 59, and the side confining element means 50.

It should also be noted that when the sealed end, thin-walled tubing is used for the elements 46, for the elements 56, or for the elements 59, that the ends of those elements may be opened to afford flow therethrough of insulating or temperature controlling gases for the assembly, the air flow through these opened tubes being a third stream separate from the first and second fluid streams discussed hereinbefore.

There has thus been disclosed a method for making a recuperator heat exchange assembly 20 which includes forming a multiplicity of elongated tubes of a glass that is thermally crystallizable to a low expansion glass ceramic. Each of the tubes are sealed at each end and contain an expansible fluid medium, each of the tubes having a portion intermediate the ends thereof which is substantially straight.

Pluralities of the tubes are tightly packed into a first plurality of layers 30 with the axes of the intermediate portions 34 of the tubes in each layer essentially parallel to each other. The first plurality of layers 30 are arranged with the intermediate tube portions 34 thereof in a stacked array with respect to each other and with the axes of the intermediate portions of the tubes in each layer 30 essentially parallel to the axes of the corresponding intermediate tube portions 34 in the other layers 30.

Each layer of tubes 30 is spaced from at least one of the adjacent layers 30 in the array by interposing spacer means 40, 42 between each of the ends of the layers being spaced. Each of the spacer means 40, 42 extend transversely across the tubes in the layers 30 being spaced and adjacent the intermediate tube portions 34 of the layers 30 to define a passageway 44 extending from a first spacer means 40 at one end of the intermediate tube portions 34 to a second spacer means 42 at the other end of the intermediate tube portions 34 of the space tube layers 30. As described hereinbefore, the spacer means 40, 42 may also function as header connecting means. The spacer means are also formed of glass that is thermally crystallizable to a low expansion glass-ceramic and has a coefficient of lineal thermal expansion that is substantially the same as the elongated sealed tubes.

Fluid flow directing means 50 are disposed longitudinally along each of the passageways 44 to receive the fluid and confine the fluid in and direct the flow of fluid through the passageways 44 in a direction parallel to and in heat exchange relationship with the intermediate tube portions 34 adjacent the passageways 44 before discharging fluid from the passageways. The flow directing means is also formed of a glass that is thermally crystallizable to a low expansion glass-ceramic having a coefficient of lineal thermal expansion that is substantially the same as the elongated sealed tubes.

The outer surface of the assembly 20 of elongated tubes 30, spacer means 40, 42, and the fluid flow directing means 50 is constrained to restrict the outward movement of those portions of the assembly. The constrained assembly is subjected to a heat treatment which includes temperatures sufficient to soften the elongated sealed tubes in the layers 30 and thus to cause the fluid medium entrapped therein to expand and urge the tubes 30 into contact with adjacent tubes and the spacer means and the flow directing means to fuse the assembly portions into an integral mass. The heat treatment further includes temperatures sufficient to effect crystallization of the tubes, the spacer means including sealants, and the flow directing means into a low expansion glass-ceramic.

The disclosed method further includes the step of opening the sealed ends of the elongated tubes in the layers 30 to enable the reception and discharge of a first fluid to obtain a heat exchange with a second fluid flowing in the passageways 44.

The step of disposing fluid flow directing means longitudinally along each of the passageways 44 may include forming a second series of layers 60 of open ended tubes, each of said second series of tubes 60 having a substantially straight portion intermediate the open ends thereof, the axes of the straight portions of the tubes of each second series layer 60 being essentially parallel to each other, and interposing at least one of the second series layers 60 in each passageway 44 in heat exchange relationship with the intermediate tube portions 34 of the first-mentioned layers 30. The axes of the straight or intermediate portion 64 of the second series layers 60 being essentially parallel to the axes of the intermediate portions 34 of the first-mentioned tube layers 30.

The second series tubes in layers 60 may be formed with open ends and with the open ends terminating short of the spacer or header connecting means 40, 42 at each end of each passageway 44, so that the open ends thereof may receive and discharge a fluid from and to the spaces defined between the spacer means 40, 42 and the open tube ends 62 of the tubes in the layers 60. The second series tubes in the layers 60 are formed with walls sufficiently thick to prevent tube collapse during the heat treatment of the assembly.

The method of manufacturing may further include the disposition of blocking means such as the extension of the elongated elements 56 of the side confining means 40 on each side of each of the pair of spaces defined between the spacing means 40, 42 and the open tube ends 62 of the second series 60, so that fluid for the second series tubes may be directed into the other side of one of each pair of defined spaces and discharged from the other side of the other of each pair of defined spaces.

The method as described hereinbefore may be applied to the manufacture of apparatus as shown in FIG. 11 in which the tube ends of the layers 60 are terminated along lines oblique to the longitudinally extending passageway 44. A third series of tube layers 60, also formed from the thermally crystallizable glass-ceramic materials described hereinbefore, having open ends which will mate with the open tube ends of the tubes in the second series layers 60 along the oblique lines defined thereby.

The third series layers 70 are disposed in each passageway 44 and extend transversely to the second series layer 60 therein to direct a fluid to and to receive a fluid from the second series layer of tubes 60. The third series layers 70 will be formed from tubes having wall thicknesses sufficient to prevent the tubes from collapsing or sagging during heat treatment. Moreover, the combined layers 60 and 70 prevent the tube layers 30 from expanding or bloating into the passageways 44 during the heat treating process.

The method of manufacture discussed hereinbefore may also be utilized in making the embodiments of the invention illustrated in FIGS. 12 through 15. In FIGS. 12 through 15 the disposition of the fluid flow directing means includes closing one side of each second series passageways 44 by extending closure means such as the elements 56 from one of a pair of spacing means 40, 42 toward, but terminating short of, the other of the pair of spacing means 40, 42 to define an entry port, and closing the other side of each second series passageway 44 by extending closure means comprised of the elements 56 from the other of the pair of spacing means 40, 42 towards, but terminating short of, the one of said pair of spacing means 40, 42 to define an exit port.

As can be seen in the embodiments illustrated in FIGS. 12 through 15 each passageway 44 may be divided into a plurality of flow paths of fluid flowing therethrough by disposing flow directing wall means 80 and 80a in each passageway 44 spaced inwardly from the passageway side closures 50 and aligned essentially parallel with the intermediate tube portions of the first-mentioned tube layers 30. The wall means 80 and 80a may be rods of the thermally crystallizable glass compositions described hereinbefore.

Figure 15:
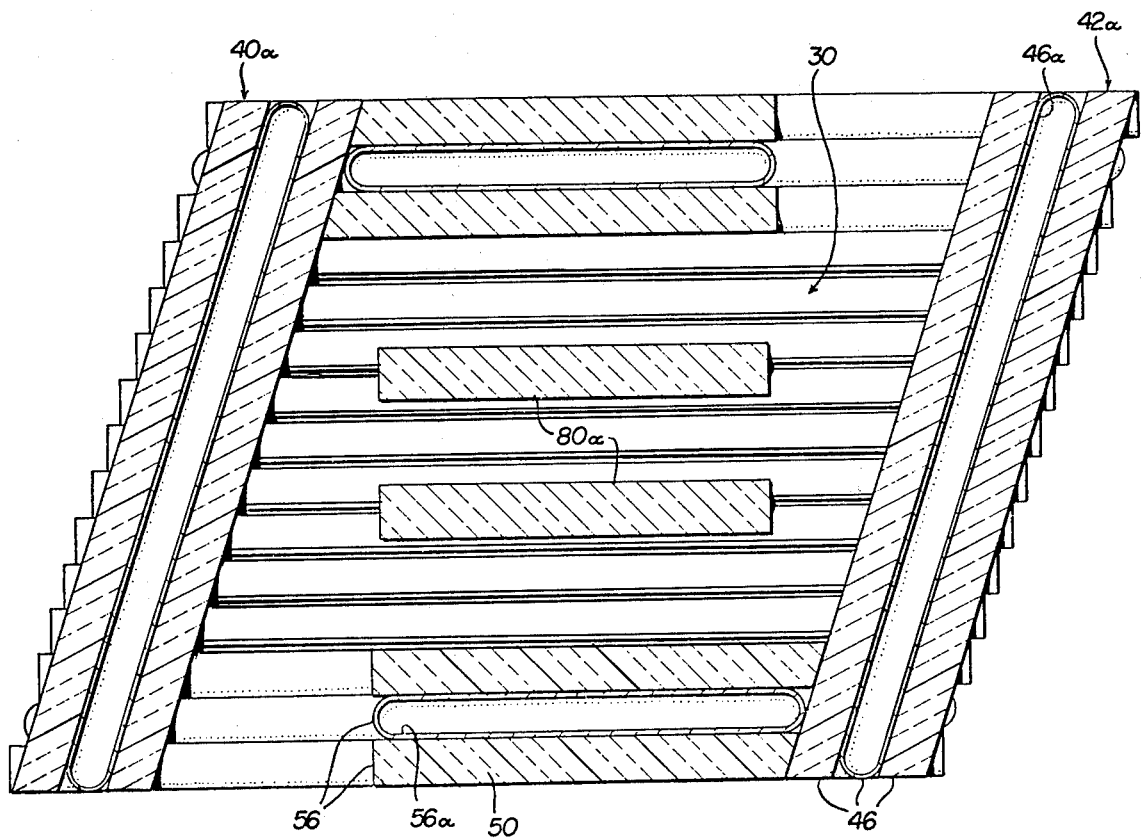
FIG. 15 is a cross-sectional view taken along lines 15—15 of the assembly portion illustrated in FIG. 14.

The angle of the interior wall of the spacing means 40, 42 with respect to the intermediate tube portions 34 of the first mentioned layers 30 may be coordinated with the length and placement of the ends of the flow directing wall means 80 in FIGS. 12 and 13 or 80a in FIGS. 14 and 15, to enable the division of a stream of fluid in a passageway 44 into a plurality of smaller streams having similar flow rates to reduce turbulence and to enhance a heat exchange between the plurality of smaller streams and intermediate tube portions 34 of the first-mentioned tube layers 30. The embodiments illustrated in FIGS. 12 through 15 thus afford larger passage areas for the second fluid and will accommodate a larger volume than will the tube layers 60 shown in FIGS. 1 through 11.

The use of glass rods or other flow directing wall means as illustrated at 80 and 80a improves the heat exchange characteristics of the assemblies in FIGS. 12 through 15 over those shown in FIGS. 1 through 11, since the heat exchange fluids are in contact with the same wall of the tubes in layers 30 rather than having to also pass heat through walls of tube layers 60. The approximately rectangular passages for the second fluid have an aspect ratio of 3:1 or 6:1 or greater, providing an excellent geometry for efficient heat transfer. Since the overall open area of the passageways 44 is greater, pressure losses are reduced.

The method as disclosed herein describes a layer spacing step which includes forming each spacing means 40, 42 from a plurality of tightly packed individually axially elongated elements 46, 46a arranged with their axes parallel to each other and disposing a group of such elements adjacent each end of the intermediate tube portions 34 of the layers 30 being spaced. Sealant material such as illustrated at 48 in FIGS. 12 and 13 may be interposed between adjacent elements 46, 46a and between each group of elements and adjacent layer of tubes to join the elements 46, 46a and the tube layers into an integral mass thereby preventing a fluid in a passageway 44 from flowing out through the interstices between the elements and between the tubes and the layers. The sealant material 48 may be a ceramic cement or a formable ceramic cement such as is described in U.S. Pat. No. 3,189,512, issued June 15, 1965, or in U.S. Pat. No. 3,634,111, issued Jan. 11, 1972, or other suitable ceramic cement.

The sealant material 48 may also be a sinterable frit. The use and disposition of a sinterable frit material to fill interstices between tubes or rods is disclosed in the copending application Ser. No. 169,216 filed Aug. 5, 1971, by Marion I. Gray, Jr., now U.S. Pat. No. 3,773,484 and assigned to the same assignee as the assignee of the present invention.

In a manner fully described in the above-referenced application Ser. No. 169,216 (U.S. Pat. No. 3,773,484) each of the glass tubes, or of the glass rods utilized either in the manufacture of the spacing means 40, 42, or the side closure means 50 (and if desired in the assembly of the layers of tubes shown in FIGS. 7 and 8) a coating of a sinterable thermally crystallizable frit is applied to the rods or tubes. The entire exterior surfaces of these tubes or rods are preferably coated with a frit composition identified in the above-referenced application Ser. No. 169,216 (U.S. Pat. No. 3,773,484), the frit composition preferably being of the same thermally crystallizable glass composition of which the tubes and rods are formed.

During the heat treating of the assembly 20 and during the bloating or expanding of the tubes and the fusion of the tube wall surfaces, and rods if utilized, into the unitary assembly, the finely divided frit will sinter and distribute itself in the interstices between the tube walls and the rods to aid in securing and fusing the walls and/or rods to one another. The frit interposed in the interstices between the expanding tubes may be subjected to substantial pressures generated by the expansion of the sealed end tubing walls. The resultant sintering, melting, and distribution of the frit will adhere the expanded tube walls to one another and to its own sintered glass-ceramic mass to join the assembly into an integral unit and seal the spaces between the tubes to prevent cross flow between the first and second fluid streams between which heat exchange is being accomplished.

The spacing step described hereinbefore advantageously includes disposing at least one, as shown at 46a in FIG. 12, or more, as shown in FIGS. 7 and 8, axially elongated tubes in each group of elements. Each such tube has relatively thin walls, sealed ends, and an expansible fluid medium therein. Each such tube is softened and expanded by the heat treatment step to compress sealant and to urge each group of tightly packed elements 46 together to aid in closing interstices and obtaining fusion between elements in a group 40, 42 and between tubes in an adjacent layer.

The same types of axially elongated elements or rods 56, 56a and sealant material 58 may be utilized in forming the fluid confining means for the longitudinal sides of the passageways 44. As shown in FIGS. 14 and 15 individually axially elongated elements 56 are tightly packed in layers and arranged with their axes parallel to each other and also parallel to the axes of the intermediate tube portions 34 of the first-mentioned layer 30. The layers of the tightly packed elements are disposed on each side of the passageways 44 formed by the intermediate tube portions 34 of the stacked array of the tube layers 30. The sealant material 58 is interposed between adjacent elongated elements 56 in a layer, between any other adjacent layers, and between elongated elements 56 and adjacent tubes of the layers 30 to join elements with tubes to prevent flow of a fluid in a passageway 44 out through interstices between elements.

As noted above the sealant means 58 may be the ceramic cement, foamable ceramic cement or a sinterable frit as described hereinbefore. It is also desirable to dispose at least one axially elongated tube 56a in each layer of the elements 56, the elongated tube having relatively thin walls, sealed ends and an expansible fluid medium therein. As the tube is softened and expanded by the heat treatment step the sealant is compressed and the elements are urged tightly together to aid in closing interstices in the fluid confining means 50.

There have thus been disclosed recuperator heat exchange assemblies, and a method for making such assemblies, which may be used to provide parallel flow or counterflow heat exchange between two different fluid streams to obtain the highest heat exchange efficiency. The self-contained units provide their own insulation with the use of the protective skins of elements 59, the header connecting or spacing means 40, 42 utilizing elements 46 or 46a, and the side confining means 50 utilizing elements 56 or 56a. The elements 59, 46, 46a, 56, and 56a may be glass-ceramic rods, tubes or a mixture of rods and tubes as described hereinbefore, all having very low thermal conductivities and thus providing excellent insulation characteristics. The elements 56b shown in FIGS. 12 and 13 may be sealed end tubes, as shown, or glass rods to provide insulation and protection.

While there have been shown and described and pointed out the fundamental novel features of the invention with a reference to the preferred embodiments thereof, those skilled in the art will recognize that various changes, substitutions, omissions and modifications in the methods and structures described may be made by those skilled in the art without departing from the spirit of the invention.

We claim:

1. A recuperator heat exchange assembly, comprising
   a. a plurality of stacked layers of elongated tubes extending lengthwise of the recuperator assembly, each tube having open ends and a portion intermediate the open ends which is essentially parallel to the corresponding intermediate portions of the other tubes in the same layer and to corresponding intermediate tube portions in the other layers to form a first series of longitudinally extending parallel passageways for receiving a first fluid, the open ends of at least one end of said tubes in said layers terminating along a line extending obliquely with respect to the longitudinally extending passages thereof;
   b. header connecting means at each end of said stacked layers of tubes supporting the opposite open tube ends of each layer to maintain the intermediate tube positions of each layer in a spaced relationship with respect to the intermediate tube portions of the tubes in the adjacent stacked layers in said assembly and to define a second series of passageways between said spaced layers of intermediate tube portions for receiving a second fluid, said header connecting means extending obliquely across tube ends at each end of said stacked layers with respect to said parallel tubes, and closing the spaces between and around the open ends of said tubes to prevent crossflow between the first and second fluid streams;

c. means extending longitudinally along each of the opposite sides of said second series passageways extending between said header connecting means at each end of said stacked layers for confining said second fluid for flow in and through said second series passageways, said side confining means having entry and exit port means formed therein on opposite sides of the recuperator assembly for respectively receiving and discharging the second fluid; and d. flow directing wall means extending along each second series passageway between said stacked tube layers and parallel therewith, said wall means being spaced laterally inwardly in said second series passageway from said side confining means thereof to guide the second fluid through each second series passageway in paths intermediate said entry and exit ports which are substantially parallel to and in heat exchange relationship with said adjacent tubes;

e. said stacked layers of tubes, header connecting means, wall means, and side confining means having essentially zero porosity, consisting essentially of an inorganic crystalline oxide ceramic material, and having an average coefficient of lineal thermal expansion of about $-18$ to $+50 \times 10^{-7}/°$ C over the range of $0°-300°$ C;

f. said stacked layers of tubes, said header connecting means, wall means, and side confining means being fusion bonded together to form an integral assembly.

2. An assembly as defined in claim 1 in which said flow directing wall means extending along each second series passageway between said stacked tube layers is positioned with respect to said entry and exit port means to enable a division of a second fluid stream in each second series passageway into a plurality of smaller streams, each smaller stream describing a longer path than a direct route between entry and exit port means to enhance the heat exchange efficiency between said second and first fluids.

3. The recuperator of claim 1 in which said flow directing wall means comprises a plurality of elongated walls in each said second series passageway, the length of each such wall being selected so that the ends thereof are located with respect to the adjacent header connecting means and said entry and exit port means to enable a division of the second fluid flow entering each of the second series passageways into a plurality of smaller streams therein having similar flow rates to reduce turbulence and enhance the heat exchange between said first and second fluids.

4. A counter-flow recuperator heat exchange assembly comprising plural first layers or elongated hollow tubes of glass ceramic material each open at their opposite ends, said hollow tubes having an inside wall diameter-to-wall-thickness ratio of at least 6.0, said first layers of tubes being disposed in spaced apart parallel relation lengthwise of the recuperator structure and having their openings at the opposite ends of said structure disposed such that they terminate along a line extending obliquely with respect to the longitudinally extending passages thereof, the tubes in said first layers being adapted for receiving a first fluid at one open end thereof and discharging said fluid at the opposite open end thereof;

plural sets of rod-like elongated elements of glass ceramic material arranged in second layers disposed between said first layers separating them from one another and defining therebetween passageways for a second fluid, each set of said elements in said second layers including (a) first elements that are substantially shorter in length than the tubes of said first layers disposed parallel to each other and on opposite sides of the recuperator structure in said second layer and engaging the tubes of said first layers, and (b) second elements disposed obliquely of the tubes of said first layers and spaced at the opposite ends of the second passageway and engaging the tubes in adjacent first layers thereof in the proximity of their opposite ends, the first and second elements in said layers collectively defining an inlet port at the one side of said structure and near one end thereof for receiving said second fluid in the second passageways, and an outlet port at the opposite side of said structure and near the other end thereof for delivering said second fluid;

plural laterally spaced apart flow directing walls of glass ceramic material disposed in each of said second passageways and spaced from the said first and second elements therein and extending substantially parallel to the tubes of the first layers, said walls dividing said second passageways into plural, substantially parallel flow paths therethrough, the length of said walls being selected so that the ends thereof are located with respect to the inlet and outlet ports, respectively, to divide the flow of second fluid into plural streams, the second fluid streams being conducted in the passageways in parallel counter-flow heat exchange relationship with said first fluid flowing in the layers of said first tubes; and sealant means fusion bonding the walls of the superimposed tubes, said first and second elements, and flow directing walls of the several layers to one another to form an integral assembly, said sealant means comprising a sintered, powdered frit material.

5. The recuperator of claim 4, wherein the rod-like elements of said plural sets include at least one solid rod in the obliquely disposed second elements across each opposite end of the assembly and at least one solid rod in the longitudinally disposed first elements along the opposite sides of the assembly.

6. The recuperator of claim 5, wherein the rod-like elements of said plural sets comprise axially elongated hollow tubes having thin walls and opposite sealed ends, each such tube having been expanded by heat treatment thereby sealingly interconnecting the walls thereof with adjacent walls of tubes of said first layers.

* * * * *